(12) United States Patent
Winter et al.

(10) Patent No.: US 7,898,785 B2
(45) Date of Patent: Mar. 1, 2011

(54) LIGHTNING PROTECTION SYSTEM FOR AN AIRCRAFT COMPOSITE STRUCTURE

(75) Inventors: Dale B. Winter, Maple Valley, WA (US); Jeffrey D. Morgan, Kent, WA (US); Steven C. Steckmyer, Issaquah, WA (US); Kevin D. Pate, Kirkland, WA (US); Darrin M. Hansen, Seattle, WA (US); John R. Porter, Lynnwood, WA (US); Jeffrey Sutton, Seattle, WA (US); Russell J. Heeter, Sammamish, WA (US); James F. Huffaker, Bothell, WA (US)

(73) Assignee: The Boeing Company, Chicago, IL (US)

( * ) Notice: Subject to any disclaimer, the term of this patent is extended or adjusted under 35 U.S.C. 154(b) by 230 days.

(21) Appl. No.: 12/171,979

(22) Filed: Jul. 11, 2008

(65) Prior Publication Data

US 2008/0297967 A1 Dec. 4, 2008

Related U.S. Application Data (63) Continuation-in-part of application No. 11/608,050, filed on Dec. 7, 2006, now Pat. No. 7,599,164.

(51) Int. Cl.
*H05F 3/00* (2006.01)
(52) U.S. Cl. .................................. 361/117; 361/218
(58) Field of Classification Search .............. 361/218, 361/117–120
See application file for complete search history.

(56) References Cited

U.S. PATENT DOCUMENTS

| 3,892,099 | A | | 7/1975 | Worgan et al. |
|---|---|---|---|---|
| 4,417,463 | A | | 11/1983 | Nelson |
| 4,502,092 | A | * | 2/1985 | Bannink et al. ............. 361/218 |
| 4,628,402 | A | | 12/1986 | Covey |
| 4,630,168 | A | | 12/1986 | Hunt |
| 4,681,497 | A | | 7/1987 | Berecz |
| 4,755,904 | A | | 7/1988 | Brick |
| 5,845,872 | A | | 12/1998 | Pridham et al. |
| 7,050,286 | B2 | | 5/2006 | Pridham et al. |
| 7,307,825 | B2 | | 12/2007 | De La Fuente De Ana et al. |

FOREIGN PATENT DOCUMENTS

WO 8401487 4/1984

OTHER PUBLICATIONS

U.S. Appl. No. 11/608,050, filed Dec. 6, 2006, Heeter et al.
USPTO office action for U.S. Appl. No. 12/573,277 dated Sep. 23, 2010.

\* cited by examiner

*Primary Examiner*—Danny Nguyen
(74) *Attorney, Agent, or Firm*—Yee & Associates, P.C.; Eric K. Satermo (57) ABSTRACT

An apparatus comprises a wall, an internal structure, and a fastener. The wall has a conductive surface and a countersunk hole. The countersunk hole passes through the internal structure. The fastener has an interference fit within the countersunk hole.

15 Claims, 6 Drawing Sheets

LIGHTNING PROTECTION SYSTEM FOR AN AIRCRAFT COMPOSITE STRUCTURE

CROSS-REFERENCE TO RELATED APPLICATION

This application is a continuation-in-part of patent application U.S. Ser. No. 11/608,050, filed Dec. 7, 2006 now U.S. Pat. No. 7,599,164, entitled "Lightning Protection System for an Aircraft Composite Structure", which is incorporated herein by reference.

BACKGROUND INFORMATION

1. Field

The embodiments described herein generally relate to fasteners used in aerospace applications, and more particularly relates to fasteners that provide lightning protection when used to fasten composite or other electrically conducting materials.

2. Background

Use of composites such as carbon fiber reinforced plastics is becoming more common as advancements in composite technologies increase. Use of composites allows designers to improve structural performance compared to metal structure and reduce weight. A major challenge to the use of composite structure is its susceptibility to the effects of lightning compared to metal.

Metal structure such as aluminum fuel tanks provide a layer of robust lightning protection given its high conductivity material property and low resistance between structural components when fastened together with certain metal fasteners. The high conductive properties of aluminum allow lightning currents to conduct through structure with relatively few adverse effects including rupture of aluminum skins or ignition sources within the fuel tank. Lightning protection for metal is typically achieved by ample skin thickness and fastening joints together using methods that will prevent ignitions.

Lightning protection of composite structure, such as carbon fiber reinforced plastic, is more complicated due to its higher electrical resistance and multi-layer construction. When lightning attaches to composite surfaces the lightning currents tend to be higher at the surface penetrating metal fasteners attached to underlying substructure than for metal structure. These currents may create ignition sources inside a structure like a fuel tank. (In some cases where the substructure is metal and the skins are composite a substantial amount of lightning current can flow into substructure such as a rib of a fuel tank. This could result in arcing and sparking between the fastener and the structural elements causing the projection of incendiary particles and gases into the fueled volume if not properly designed.)

These underlying components include, for example, fuel tanks, which may be metallic or of a conductive composite material, such as for example, carbon fiber reinforced plastic ("CFRP"). While metallic tanks minimize conduct currents into the aircraft substructure, lightning poses a greater potential hazard when the fuel tank is made of a conductive composite material. Generally, upper surfaces of metallic fasteners, that secure the tank and that penetrate into the fuel tank, are exposed to direct lightning attachment. As a result, there is a potential susceptibility to sparking/arcing inside the conductive composite fuel tank from these fasteners as very high lightning currents can enter the skin and substructure components of the fuel tank via the fasteners. Under certain conditions, this could result in ignition within the fuel tank.

Figure 1:
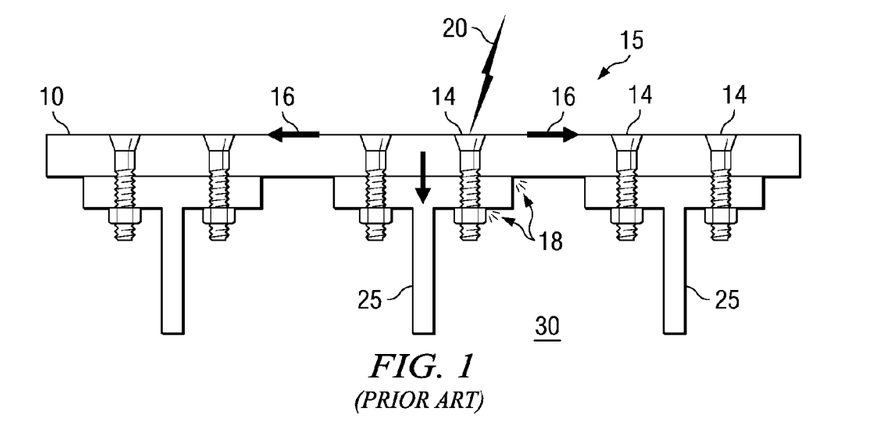
FIG. 1 is a schematic partial cross section view of a prior art portion of a fuel tank showing skin fastened to tank substructure with fastener heads exposed to lightning strikes.
Figure 2:
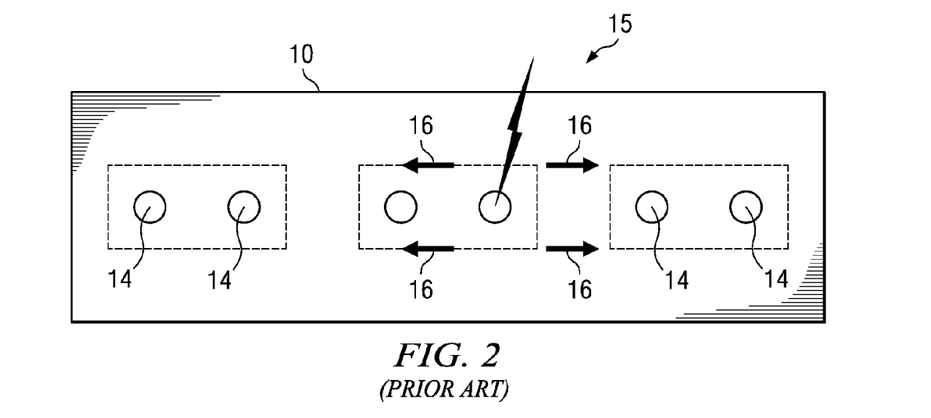
FIG. 2 is a top view of the prior art fuel tank portion of FIG. 1.

FIGS. 1 and 2 depict the potential effects of lightning attachment 20 directly to the head of a fastener 14 used to attach a CFRP fuel tank skin 10 to metal substructure 25 of the fuel tank 15 (a portion of the tank is depicted). The conductivity of the metal substructure 25, and its multiple attachment points to aircraft structure (not shown), create favorable conditions for potentially drawing lightning currents into the fuel tank volume 30. As shown by arrows 16, energy flows along the outer surface of the skin 10 and through the skin 10. These energy flows are sufficiently high to generate "hot particles" 18 that may eject from the fasteners 14 into the fuel tank interior 30 thereby creating a hazard.

To avoid the potential for ignition sources, some fuel tanks have fastener assemblies that are capable of carrying large lightning currents without generating hot particles or sparking. Other fuel tank attachments avoid direct attachment of the fuel tank to the aircraft substructure and utilize patches over the fasteners of the tank skin, to shield the tank from lightning attachment. However, these methods present manufacturing challenges that make utilization difficult, expensive and prone to failure.

Accordingly, it is desirable to shield or otherwise protect a fuel tank with a conductive composite skin from current and voltage surges from a lightning strike. The fuel tank protection should avoid the formation of hot particles that eject into the fuel tank volume, or arcing into the tank. In addition, the protective technology should be relatively straightforward to implement in routine manufacturing processes. Furthermore, other desirable features and characteristics of the technology for lightning protection for fuel tanks will become apparent from the subsequent detailed description and the appended claims, taken in conjunction with the accompanying drawings and the foregoing technical field and background.

SUMMARY

In one advantageous embodiment, an apparatus comprises a wall, an internal structure, and a fastener. The wall has a conductive surface and a countersunk hole. The countersunk hole passes through the internal structure. The fastener has an interference fit within the countersunk hole.

In another advantageous embodiment, a fuel tank comprises a tank wall structure, a conductive material, an internal structure, a conductive fastener, a retaining element, and a dielectric filler. The tank wall structure has a surface and a countersunk hole passing through the surface. The conductive material is arranged along a fastener line on the surface of the tank wall structure. The conductive fastener has a head and a shank having a terminal end, wherein the conductive fastener is located in the countersunk hole with an interference fit and wherein a gap is present between a gap above the head of the conductive fastener in the countersunk hole. The retaining element is attached to the terminal end of the shank. The dielectric filler fills the gap above the head of the conductive fastener in the countersunk hole.

In yet another advantageous embodiment, a method is provided for manufacturing a fuel tank. A fuel tank wall is positioned with an internal structure for the fuel tank. A plurality of countersunk holes is formed through the fuel tank wall and the internal structure at a plurality of fastener points. A plurality of fasteners is placed in the plurality of countersunk holes in which an interference fit is present for the plurality of fasteners. Gaps between heads for the plurality of fasteners and a surface of the fuel tank wall are filled with a dielectric material.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

Various embodiments will hereinafter be described in conjunction with the following drawing figures, wherein like numerals denote like elements.

DETAILED DESCRIPTION

The following detailed description is merely exemplary in nature and is not intended to limit the described embodiments or the application and uses of the described embodiments. Furthermore, there is no intention to be bound by any expressed or implied theory presented in the preceding technical field, background, brief summary or the following detailed description.

Figure 3:
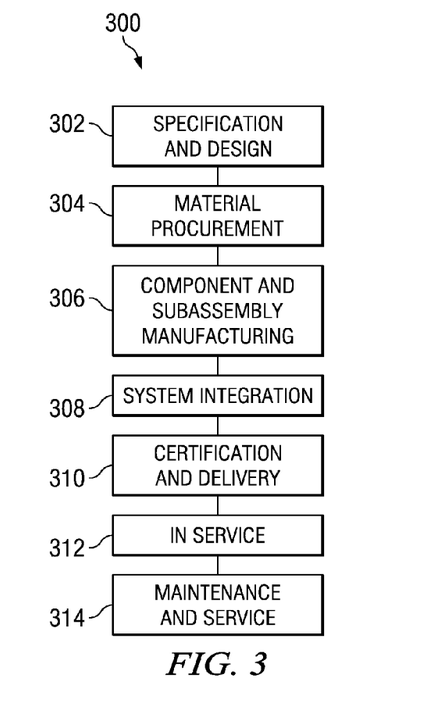
FIG. 3 is a diagram illustrating an aircraft manufacturing and service method in accordance with an exemplary embodiment.
Figure 4:
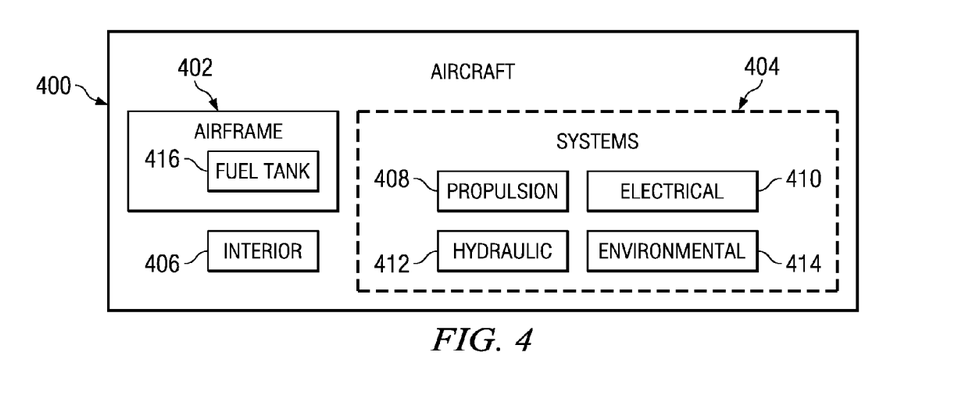
FIG. 4 is a diagram of an aircraft in accordance with an advantageous embodiment.

Referring more particularly to the drawings, embodiments of the disclosure may be described in the context of the aircraft manufacturing and service method 300 as shown in FIG. 3 and aircraft 400 as shown in FIG. 4. Turning first to FIG. 3, a diagram illustrating an aircraft manufacturing and service method is depicted in accordance with an advantageous embodiment. During pre-production, exemplary aircraft manufacturing and service method 300 may include specification and design 302 of aircraft 400 in FIG. 4 and material procurement 304.

During production, component and subassembly manufacturing 306 and system integration 308 of aircraft 400 in FIG. 4 takes place. Thereafter, aircraft 400 in FIG. 4 may go through certification and delivery 310 in order to be placed in service 312. While in service by a customer, aircraft 400 in FIG. 4 is scheduled for routine maintenance and service 314, which may include modification, reconfiguration, refurbishment, and other maintenance or service.

Each of the processes of aircraft manufacturing and service method 300 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 4, a diagram of an aircraft is depicted in which an advantageous embodiment may be implemented. In this example, aircraft 400 is produced by aircraft manufacturing and service method 300 in FIG. 3 and may include airframe 402 with a plurality of systems 404 and interior 406. Examples of systems 404 include one or more of propulsion system 408, electrical system 410, hydraulic system 412, and environmental system 414. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 300 in FIG. 3. For example, components or subassemblies produced in component and subassembly manufacturing 306 in FIG. 3 may be fabricated or manufactured in a manner similar to components or subassemblies produced while aircraft 400 is in service 312 in FIG. 3. Also, one or more apparatus embodiments, method embodiments, or a combination thereof may be utilized during production stages, such as component and subassembly manufacturing 306 and system integration 308 in FIG. 3, for example, without limitation, by substantially expediting the assembly of or reducing the cost of aircraft 400. Similarly, one or more of apparatus embodiments, method embodiments, or a combination thereof may be utilized while aircraft 400 is in service 312 or during maintenance and service 314 in FIG. 3.

In this example, aircraft 400 includes fuel tank 416 within airframe 402. Fuel tank 416 may be, for example, a metal fuel tank or a composite fuel tank. In one illustrative example, a method and apparatus according to an advantageous embodiment may be implemented during component and subassembly manufacture 306 and/or system integration 308 to fabricate fuel tank 416 for aircraft 400.

In accordance with an exemplary embodiment, a conductive composite fuel tank has a conductive layer or strip extending on its outer surface, exposed to the lightning-producing environment. The conductive layer may be embedded in the outer surface of the conductive tank skin during tank fabrication of a composite tank. For example, the conductive layer may be effectively adhered to the skin during a tank skin cure process. Alternatively, the conductive strip may be bonded to the tank skin with an adhesive suitable for use in aerospace applications.

In either event, the conductive layer must be tightly adherent to avoid separation of the layer from the tank skin during ordinary conditions of use. The conditions may include, for example, differential expansion between tank skin and conductive layer because of different coefficients of thermal conductivity of the materials. In addition, some flexing of wing mounted tanks is to be expected, and the flexing should not cause separation of the conductive layer from the tank outer surface.

In an embodiment, the conductive layer covers areas of the tank skin through which fasteners will extend to mount the tank to its substructure of the aircraft. Since these fasteners ordinarily occur along a predetermined fastener centerline, an embodiment of the conductive layer includes a strip of conductive material that covers at least the fastener centerline. The conductive layer should be sufficiently wide and/or thick that it is able to dissipate the energy of a lightning strike by permitting current to flow through itself to aircraft structure for transmission to a grounding system.

The dimensions of the conductive layer will consequently vary according to the material used, and other factors, such as manufacturing ease, etc. In one embodiment, the strips are metallic. Strips of expanded aluminum foil are useful as lightweight conductors, for example, but other suitable metallic strips may also be used. For example, mesh metallic strips also provide a lightweight good conductor.

According to an embodiment, fasteners that attach the fuel tank skin to substructure extend through holes in the skin. These holes are countersunk on the tank skin outer surface so that fastener heads are below the outer surface of the skin and not in contact with the conductive layer on the outer surface of the fuel tank skin. The sunken heads of the fasteners are covered with a dielectric or nonconductive material plug. Accordingly, electrical communication or continuity from the plug or surrounding conductive strip is minimal, if any.

As a consequence, lightning attachment results in energy dissipation along the conductive layer and not to the tank interior via the length of the fasteners, from fastener head to fastener terminal end. The dielectric or nonconductive plugs must be tightly adherent and resist separation from the countersunk through hole regions during ordinary conditions of use. The conditions may include, for example, differential expansion between tank skin and plug material because of different coefficients of thermal conductivity of the materials. In addition, some flexing of wing mounted tanks is to be expected, and the flexing should not cause separation of the plugs from the countersunk through holes.

In another advantageous embodiment, an apparatus has a wall, and internal structure, and a conductive fastener. The wall has a conductive surface and a countersunk hole. The countersunk hole passes through the internal structure. The fastener has an interference fit within the countersunk hole. In this manner, the fastener may connect the wall to the internal structure.

Further, the interference fit may provide more evenly distributed contact between the fastener and the wall of the countersunk hole. The interference fit also may distribute electrical current more evenly through the wall and/or internal structure if an electrical current is applied to the fastener. This interference fit also may reduce and/or prevent arcing or sparking between the fastener, the wall, and/or the internal structure. The interference fit may be implemented, in some advantageous embodiments, using a sleeve that is placed into the countersunk hole before the fastener is inserted into the hole to minimize damage to the composite material around the hole.

Figure 5:
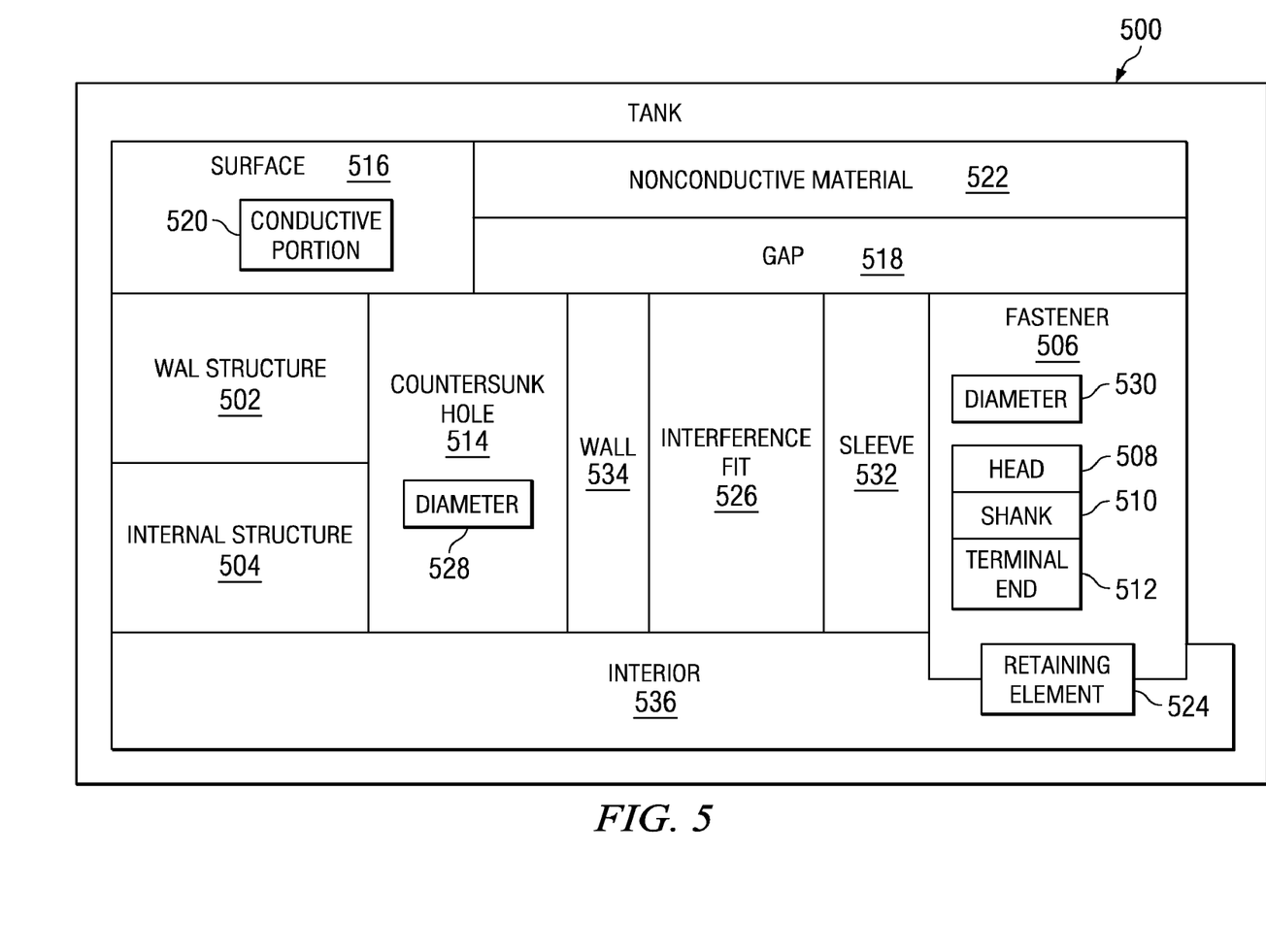
FIG. 5 is a block diagram of a tank in accordance with an advantageous embodiment.

With reference now to FIG. 5, a block diagram of a tank is depicted in accordance with an advantageous embodiment. In this example, tank 500 may be a fuel tank such as, for example, fuel tank 416 for aircraft 400 in FIG. 4. In this illustrative example, tank 500 includes wall structure 502 and internal structure 504. Structures such as, for example, wall 502 and internal structure 504, may be attached to each other to form tank 500.

In these examples, wall structure 502 may be a composite material. Of course, in other advantageous embodiments, wall structure 502 also may be a metallic wall structure, such as aluminum or titanium. Wall structure 502 with conductive portion 520 forms a conductive shell for tank 500 in these examples. When wall structure 502 is made from a metallic material, wall structure 502 provides the conductivity for the shell of tank 500. Internal structure 504 may be, for example, a spar, a rib, or some other internal structure for tank 500. The attachment of these components may be made using fasteners, such as fastener 506. Fastener 506 has head 508, shank 510, and terminal end 512.

In these examples, fastener 506 is any device that is capable of mechanically joining, attaching, affixing, or otherwise securing two or more objects together. In these examples, fastener 506 may be, for example, without limitation, a bolt, a screw, a pin, a rivet, or some other suitable fastening mechanism typically made of titanium, steel, Inconel® alloy or aluminum. Inconel is a registered trademark of Special Metals Corporation.

Fastener 506 may be used to attach wall structure 502 to internal structure 504 by securing fastener 506 into countersunk hole 514. A countersunk hole may be a conical hole cut, drilled, bored, or otherwise formed through wall structure 502 and internal structure 504.

When fastener 506 is placed into countersunk hole 514, head 508 may be flush to surface 516 or may have gap 518 above head 508 of fastener 506 with respect to surface 516. Surface 516 may be made smooth or flush by placing nonconductive material 522 into gap 518 in these examples. Nonconductive material 522 may be, for example, a dielectric material, such as, for example, an organic or inorganic material such as polyimids, polysulfide ceramic coatings, or some other suitable material.

Further, in this example, surface 516 has conductive portion 520. Conductive portion 520 may have a form and/or region that may encompass all of the areas in which fasteners, such as fastener 506, are present. Conductive portion 520 may take the form of a line or region on surface 516 of wall structure 502. This line may be a straight line or a curved line, depending on the pattern in which fasteners are located. The width of the line encompasses the fasteners, in these illustrative examples.

In these advantageous embodiments, fastener 506 may be further secured within countersunk hole 514 through the use of retaining element 524. Retaining element 524 may be attached to terminal end 512 of fastener 506 when fastener 506 is placed into countersunk hole 514. Retaining element 524 may be, for example, a nut, a collar, or some other suitable fastening mechanism to retain fastener 506 within countersunk hole 514. In another example, retaining element 524 may be, for example, a sealant. In yet another example, retaining element 524 may include both a nut typically made of steel, titanium, corrosion resistant steels, as well as aluminum, and a sealant, such as polysulfide.

In these illustrative examples, interference fit 526 is present for fastener 506 within countersunk hole 514. Interference fit 526 provides for a tighter fit as compared to a normal fit. Interference fit 526 may make it less likely that fastener 506 becomes dislodged or moves out of place in or from countersunk hole 514. Interference fit 526 may be created by forming diameter 528 of countersunk hole 514 slightly smaller than diameter 530 of fastener 506.

In other advantageous embodiments, interference fit 526 may be achieved by placing sleeve 532 within countersunk hole 514 against wall 534 of countersunk hole 514. Fastener 506 may then be placed into countersunk hole 514 with sleeve 532. Sleeve 532 may expand to provide interference fit 526 when fastener 506 is placed into countersunk hole 514.

Interference fit 526 provides a more evenly distributed contact as opposed to a normal fit for countersunk hole 514. This increased or more evenly distributed contact with wall 534 may provide more even distribution of any electrical current into wall structure 502 and/or internal structure 504 if a current is applied to fastener 506. Additionally, interference fit 526 may reduce and/or prevent sparks and/or arcs from occurring between fastener 506 and wall 534.

As a result, the likelihood of hot particles being ejected from fastener 506 into interior 536 of tank 500 may be reduced and/or eliminated. In this manner, additional protection against undesired effects from currents may occur if a failure occurs in nonconductive material 522 and an electrical current reaches fastener 506.

In these examples, nonconductive material 522 may serve to prevent an electrical current from reaching fastener 506 if an electrical current is applied to surface 516. Further, conductive portion 520 may channel electrical current away from fastener 506 if current is applied to surface 516 of wall structure 502. Also, in the advantageous embodiments, retaining element 524 also may produce and/or prevent any sparking, hot particles, and/or arcing that may occur from leaving countersunk hole 514 and reaching interior 536 of tank 500.

In this manner, sparks, hot particles, arcs, and/or other undesirable effects may be prevented from reaching any liquids or vapors within interior 536 of tank 500. Retaining element 524 provides a fault tolerant feature to aid in preventing fastener 506 from moving and/or becoming dislodged from countersunk hole 514. Thus, tank 500 may provide fault tolerant performance against failures of individual elements due to wear, aging or other causes and will not expose the fuel tank to a potential ignition source if struck by lightning.

The illustration of the fastening system for tank 500 in FIG. 5 is provided for illustrating functional features for some advantageous embodiments. This illustration is not meant to imply physical and/or architectural limitations as to the manner in which the advantageous embodiments may be implemented. For example, in other advantageous embodiments, multiple fasteners may be present within tank 500. As another example, countersunk hole 514 may extend through three or more structures with fastener 506 fastening the structures to each other.

Although tank 500 is described as a fuel tank for aircraft 400 in FIG. 4, tank 500 may be implemented in other forms. For example, tank 500 may be a fuel tank for a spacecraft, a submarine, a truck, a ship, or some other suitable vehicle. Further, tank 500 may be a tank for carrying liquids and/or vapors other than fuel. For example, tank 500 may carry chemicals in a manufacturing plant, a power plant, or some other building.

Figure 6:
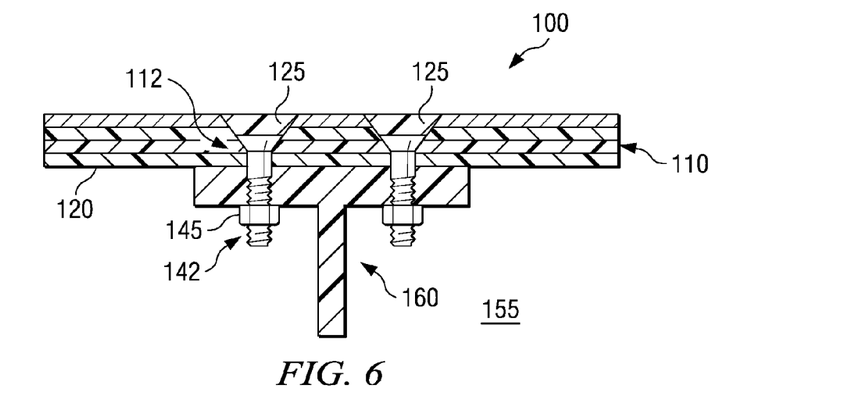
FIG. 6 is a fuel tank in accordance with one advantageous embodiment.
Figure 7:
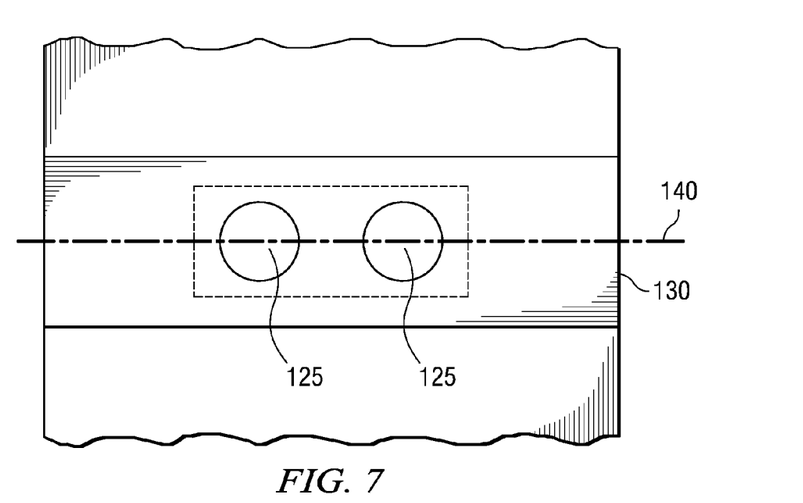
FIG. 7 is a fuel tank in accordance with one advantageous embodiment.
Figure 8:
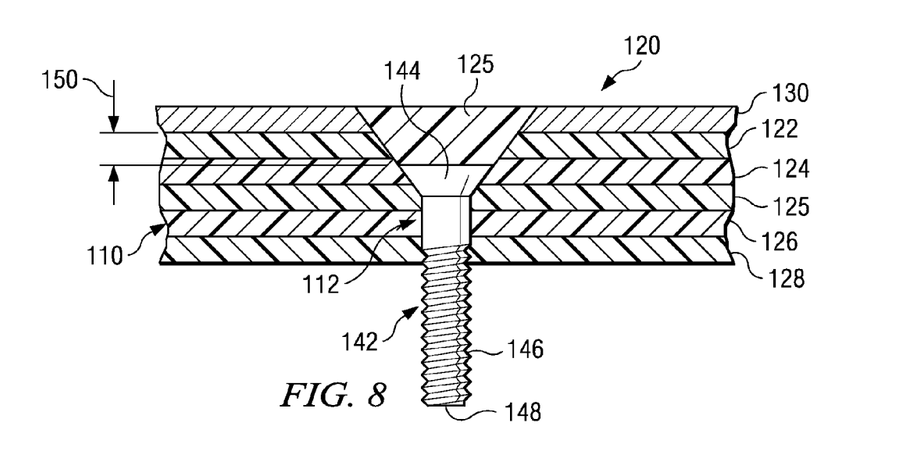
FIG. 8 is a fuel tank in accordance with one advantageous embodiment.

As illustrated in FIGS. 6-8, a fuel tank portion 100 has a fuel tank skin 110 of a layered composite material 120. In the exemplary embodiment shown, the composite material has five layers 122, 124, 125, 126, 128 and has an outer conductive strip 130, as seen more clearly in FIG. 5. The conductive strip 130 extends along the fastener centerline 140. The fuel tank skin 110 has a through-hole 112 sized to receive a fastener 142 that has a fastener head 144, a shank 146 and a terminal end 148, as seen more clearly in FIG. 5.

The through-hole 112 is counter sunk so that fastener head 144 lies below the outer conductive strip 130 by a gap 150 when the fastener 142 is tightened in place. In order to minimize any risk of electrical continuity or communication between the outer conductive strip 130 and the fastener head 144, the gap 150 may be in the range from about 1 mm to about 254 mm. As shown, the fastener 142 extends through the through-hole 112 and tank substructure 160 of the tank interior volume 155 to affix the tank skin 110 to the tank substructure 160 when appropriate torque is applied to nut 145.

Once the fastener 142 is secured, a plug 125 of a dielectric or nonconductive material is applied to fill the gap 150 between the fastener head 144 and the outer conductive strip 130. The plug 125 is in intimate contact with fastener head 144. The dielectric material or non-conductive material may be for example: glass fiber in a matrix of a non-conductive phenolic or epoxy resin, and the like. The plus 125 of material filling the gap 150 creates an impedance greater than that between the conductive surface and the tank skin 110. This is intended to significantly lower substructure currents and lower the likelihood of sparking or arcing inside the tank volume 155.

Figure 9:
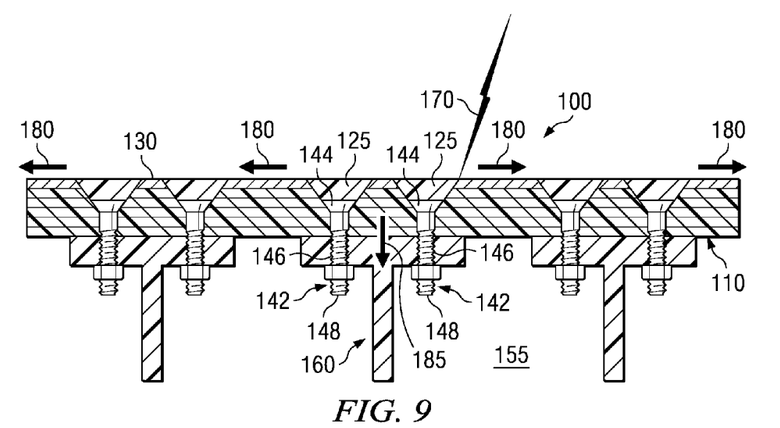
FIG. 9 is a schematic cross sectional view of a portion of a fuel tank in accordance with another exemplary embodiment.
Figure 10:
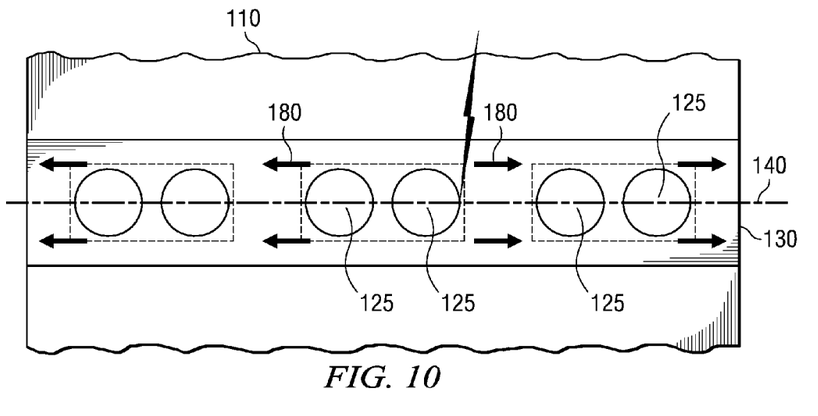
FIG. 10 is a top view of a portion of a fuel tank in accordance with another exemplary embodiment.

Referring to FIGS. 9 and 10, when lightning 170 strikes the plug 125 covering fastener head 144, the major portion of the lightning energy flows along the outer conductive strip 130, in the direction shown by arrows 180, to aircraft substructure (not shown) and thence to a grounding system (not shown). A portion of the energy may flow through the tank skin 110, as shown by arrow 185 to the fuel tank substructure 160. However, any such energy flow is too small to result in arcing into the fuel tank interior volume 155 or to cause hot particle ejection into tank interior volume 155. The fasteners 142 do not carry any significant amount of energy into the fuel tank interior. Accordingly, the fuel tank interior volume 155 is protected from the effects of lightning strikes.

Figure 11:
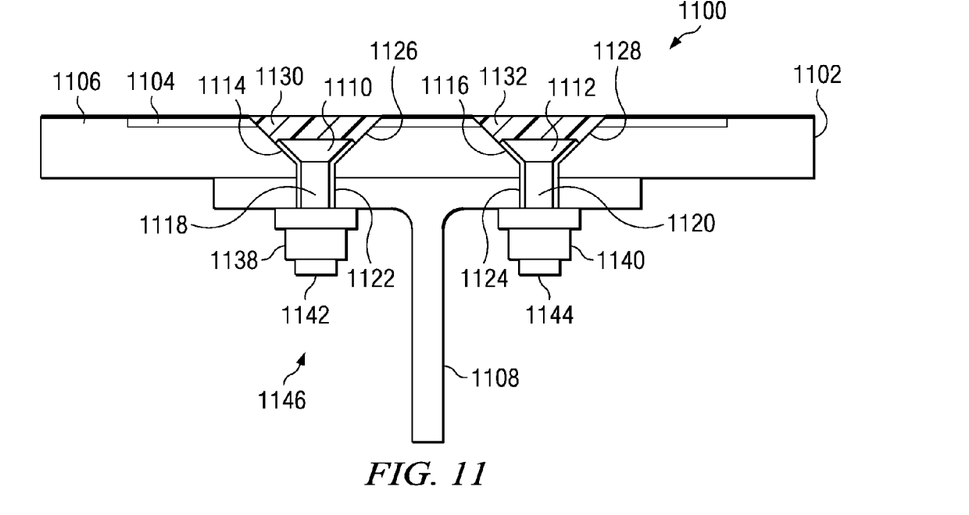
FIG. 11 is a diagram of a portion of a fuel tank in accordance with an advantageous embodiment.

With reference now to FIG. 11, a diagram of a portion of a fuel tank is depicted in accordance with an advantageous embodiment. In this example, a portion of fuel tank 1100 is illustrated. Fuel tank 1100 may be an example of one implementation of tank 500 in FIG. 5.

In this illustrative embodiment, skin panel 1102 is an example of wall structure 502 in FIG. 5. Skin panel 1102 may be a metal and/or composite skin panel depending upon the particular implementation. When a composite skin panel is used, skin panel 1102 may have layers, such as those illustrated in FIGS. 6-8.

Outer conductive strip 1104 is present in the depicted example and forms part of surface 1106 of skin panel 1102. Outer conductive strip 1104 is an example of conductive portion 520 in FIG. 5. Outer conductive strip 1104 may be, for example, a metallic foil strip. If skin panel 1102 is a metal skin panel, outer conductor strip 1104 is unnecessary.

In this example, skin panel 1102 is attached to internal structure 1108 of fuel tank 1100. Internal structure 1108 is an example of internal structure 504 in FIG. 5. In this example, internal structure 1108 may be, for example, a spar or a rib. Internal structure 1108 may be metal and/or composite depending on the particular implementation.

In this example, fasteners 1110 and 1112 are used to attach skin panel 1102 to internal structure 1108. Fasteners 1110 and 1112 are placed into countersunk holes 1114 and 1116. As can be seen, countersunk holes 1114 and 1116 are conical in shape near surface 1106 and extend through skin panel 1102 and internal structure 1108.

In these illustrative examples, fasteners 1110 and 1112 may be interference fit fasteners. In one example, the diameter of shank 1118 and shank 1120 may be slightly larger than the diameter of countersunk holes 1114 and 1116. In this manner, fasteners 1110 and 1112 may have a tighter contact with the walls of countersunk holes 1114 and 1116. In other illustrative examples, sleeves 1122 and 1124 may be placed into countersunk holes 1114 and 1116 prior to fastener 1110 and fastener 1112 being placed into countersunk hole 1114 and countersunk hole 1116. In either case, the diameter of the shank or the shank and the sleeve are larger than the hole.

Further, countersunk holes 1114 and 1116 are formed such that gap 1126 and gap 1128 are present when fastener 1110 and fastener 1112 are placed in countersunk hole 1114 and countersunk hole 1116. Gap 1126 and gap 1128 may be filled with dielectric filler 1130 and dielectric filler 1132. Dielectric filler 1130 and dielectric filler 1132 may provide for a flush or smooth form for surface 1106. Additionally, dielectric filler 1130 and dielectric filler 1132 may prevent any electrical current applied to skin panel 1102 from reaching fastener 1110 and fastener 1112.

In these examples, collar 1138 and collar 1140 are attached to terminal end 1142 of fastener 1110 and terminal end 1144 of fastener 1112. Collar 1138 and collar 1140 may aid in maintaining fastener 1110 and fastener 1112 in place within countersunk hole 1114 and countersunk hole 1116. Further, collar 1138 and collar 1140 also may prevent any sparks that may occur within countersunk hole 1114 and countersunk hole 1116 from reaching internal region 1146 of fuel tank 1100.

Figure 12:
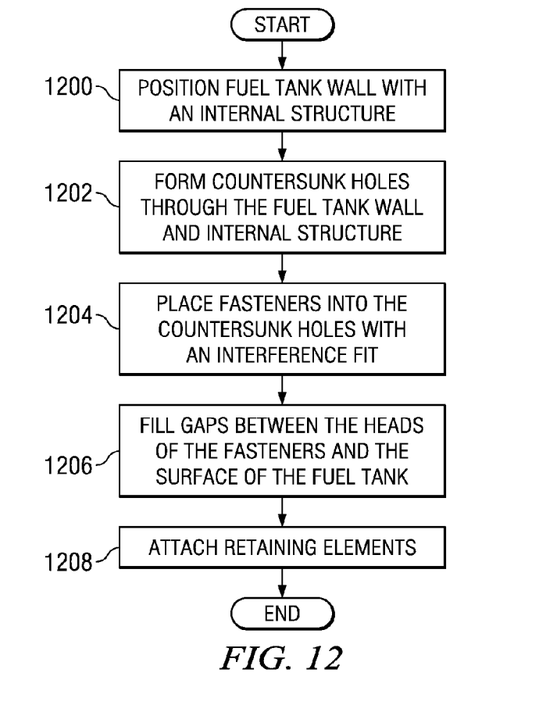
FIG. 12 is a flowchart of a process for manufacturing a fuel tank in accordance with an advantageous embodiment.

With reference now to FIG. 12, a flowchart of a process for manufacturing a fuel tank is depicted in accordance with an advantageous embodiment. The process illustrated in FIG. 12 may be implemented to create a fuel tank, such as tank 500 in FIG. 5.

The process begins by positioning the fuel tank wall with an internal structure (operation 1200). This operation is performed to position the various components of the fuel tank with respect to each other. Next, countersunk holes are formed through the fuel tank wall and the internal structure (operation 1202). The internal structure may be formed from one or more internal structural elements such as, for example, without limitation, spars, ribs, or other suitable structures.

The process places fasteners into the countersunk holes with the interference fit (operation 1204). The process fills gaps between the heads of the fasteners and the surface of the fuel tank (operation 1206). The process then attaches retaining elements to the terminal ends of the fasteners (operation 1208), with the process terminating thereafter. These retaining elements may be, for example, collars, nuts, sealants, or some other combination of these and other suitable elements.

The different operations illustrated in FIG. 12 are presented for purposes of illustrating one manner in which a fuel tank may be assembled according to the advantageous embodiments. Of course, other operations in addition to or in place of these may be used depending on the particular embodiment. Further, in some advantageous embodiments, some of these operations may be performed concurrently with other operations or in other orders other than that illustrated in FIG. 12. For example, operation 1208 may be performed prior to performing operation 1206 or may be performed at the same time, depending upon the particular implementation.

Thus, the different advantageous embodiments provide a method and apparatus for a fuel tank. The tank may have a wall with a conductive surface and a countersunk hole. An internal structure may be present in which a countersunk hole passes through the internal structure. A fastener having an interference fit is located within the countersunk hole. The interference fit may reduce the effects of any currents that may reach the fastener from a current that may be applied to the wall.

Further, the fastener also may have a retaining element at the terminal end of the fastener to aid in retaining or securing the fastener within the countersunk hole. Further, the retaining element also may reduce the possibility that a spark or arc that may occur between the fastener and the countersunk hole will reach an internal portion of the tank. In this manner, the different advantageous embodiments provide additional features for introducing undesired effects from the application of currents to a fuel tank to provide fault tolerance and prevent failures of design elements from exposing the fuel tank to potential ignition sources if struck by lightning.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
    a tank comprising:
        a tank wall having a conductive surface and a countersunk hole; and
        an internal tank structure internal of the tank wall, wherein the countersunk hole passes through the internal tank structure;
    a conductive fastener for fastening the internal tank structure to the tank wall, the conductive fastener located in the countersunk hole with an interference fit;
    a sleeve located between the fastener and the countersunk hole to form the interference fit;
    a gap above a head of the conductive fastener in the countersunk hole, wherein the gap is a distance between the head of the conductive fastener and the conductive surface of the tank wall; and
    a dielectric material filling the gap, wherein the distance is selected to reduce a likelihood that electrical current will be conducted from the conductive surface of the tank wall to the head of the conductive fastener.

2. The apparatus of claim 1, wherein the interference fit distributes an electrical current reaching the fastener through the wall.

3. The apparatus of claim 2, wherein the interference fit reduces one of a spark and an arc from the electrical current reaching the fastener.

4. The apparatus of claim 1, wherein the tank wall is a composite wall and wherein the conductive surface is a portion of a surface of the tank wall and comprises a conductive material within the composite wall.

5. The apparatus of claim 1 further comprising:
    a retaining element attached to a terminal end of the fastener.

6. The apparatus of claim 1, wherein the tank comprises a fuel tank.

7. The apparatus of claim 1, wherein the internal tank structure is selected from one of a spar and a rib.

8. A fuel tank comprising:
a fuel tank wall structure having a surface and a countersunk hole passing through the fuel tank wall structure from the surface;
a conductive material arranged along a fastener line on the surface of the fuel tank wall structure;
an internal fuel tank structure internal of the fuel tank wall structure, the countersunk hole also passing through the internal fuel tank structure, wherein the internal fuel tank structure comprises one of a spar and a rib;
a conductive fastener having a head and a shank having a terminal end, wherein the conductive fastener is located in the countersunk hole with an interference fit and wherein a gap is present between the head of the conductive fastener in the countersunk hole and the conductive material on the surface of the fuel tank wall structure, the gap comprising a distance between the head of the conductive fastener and the conductive material, wherein the distance is selected to reduce a likelihood that electrical current will be conducted from the conductive material to the head of the conductive fastener;
a sleeve located between the conductive fastener and the countersunk hole to form the interference fit;
a retaining element attached to the terminal end of the shank; and
a dielectric filler filling the gap between the head of the conductive fastener in the countersunk hole and the conductive material on the surface of the fuel tank wall structure.

9. The fuel tank of claim 8, wherein the retaining element is selected from one of a nut and a collar.

10. The fuel tank of claim 8, wherein the conductive fastener is selected from one of a bolt, a rivet, and a screw.

11. The fuel tank of claim 8, wherein the interference fit distributes an electrical current reaching the conductive fastener through the fuel tank wall structure.

12. The fuel tank of claim 11, wherein the interference fit reduces one of a spark and an arc from the electrical current reaching the conductive fastener.

13. The fuel tank of claim 8, wherein the fuel tank is for one of an aircraft, a submarine, a ship, a bus, a truck, and a spacecraft.

14. A method for manufacturing a fuel tank, the method comprising:
positioning a fuel tank wall of the fuel tank with respect to an internal fuel tank structure internal of the fuel tank wall;
forming a plurality of countersunk holes through the fuel tank wall and the internal fuel tank structure at a plurality of fastener points;
placing a sleeve in each of the plurality of countersunk holes;
placing a fastener in each of the sleeves, the fasteners expanding the sleeves to form an interference fit between the fasteners and the plurality of countersunk holes, and forming gaps between heads for the fasteners and a surface of the fuel tank wall, wherein a gap is a distance between the heads for the fasteners and a surface of the fuel tank wall, and wherein the distance is selected to reduce a likelihood that electrical current will be conducted from the surface of the fuel tank wall to the heads for the fasteners; and
filling the gaps between the heads for the fasteners and a surface of the fuel tank wall with a dielectric material.

15. The method of claim 14 further comprising:
attaching retaining elements to terminal ends of the fasteners.

* * * * *